March 3, 1970

H. C. FUNK 3,498,150

TRANSMISSION

Filed July 15, 1968

HOWARD C. FUNK
INVENTOR.

BY

William S. Dorman
ATTORNEY

HOWARD C. FUNK
INVENTOR.

BY William S. Dorman
ATTORNEY

HOWARD C. FUNK
INVENTOR.

March 3, 1970     H. C. FUNK     3,498,150
TRANSMISSION
Filed July 15, 1968     6 Sheets-Sheet 4
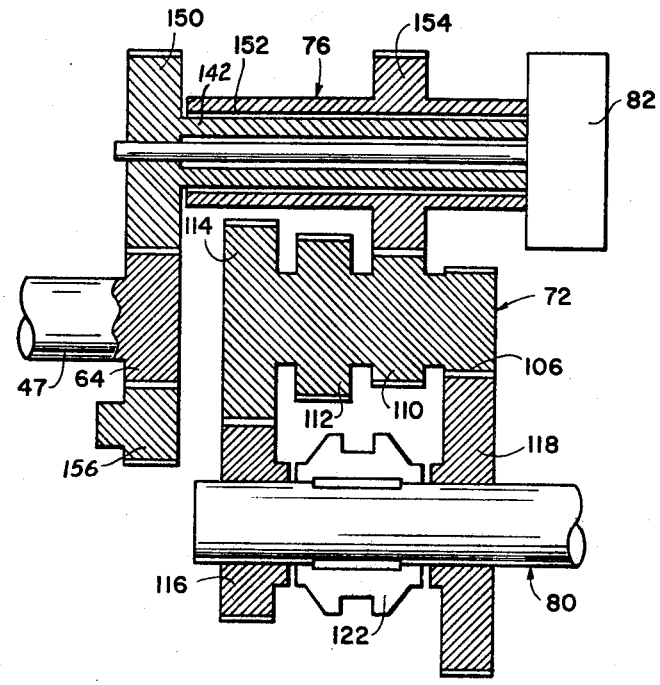
FIG. 4
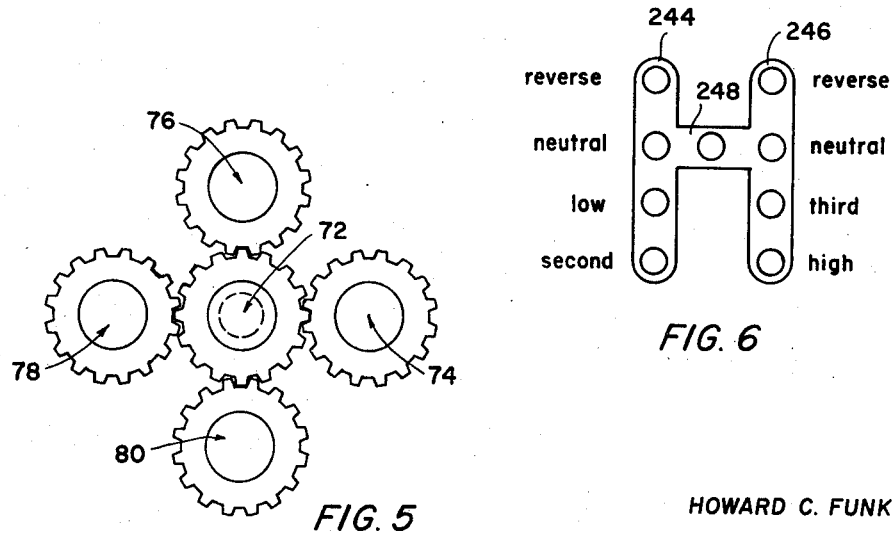
FIG. 5
FIG. 6
HOWARD C. FUNK
INVENTOR.
BY
*William S. Dorman*
ATTORNEY

HOWARD C. FUNK
INVENTOR.

BY William S. Dorman
ATTORNEY

March 3, 1970  H. C. FUNK  3,498,150
TRANSMISSION

Filed July 15, 1968  6 Sheets-Sheet 6

HOWARD C. FUNK
  INVENTOR.

BY
*William S. Dorman*
  ATTORNEY

United States Patent Office 3,498,150
Patented Mar. 3, 1970

3,498,150
TRANSMISSION
Howard C. Funk, Coffeyville, Kans., assignor to Funk Mfg. Company, Coffeyville, Kans., a corporation of Oklahoma
Filed July 15, 1968, Ser. No. 744,778
Int. Cl. F16h 3/08
U.S. Cl. 74—331                                    14 Claims

ABSTRACT OF THE DISCLOSURE

A transmission device particularly for use in conjunction with heavy duty industrial engine units, large off highway vehicles, or the like. The transmission device has four forward speeds and two reverse speeds and utilizes a single shift lever for operation of all positions. In addition, the device utilizes only three clutches for the operation thereof.

---

This invention relates to improvements in transmissions and more particularly, but not by way of limitation, to a heavy duty transmission having four forward speeds and two reverse speeds operable by a single shift lever.

Heavy duty industrial units, large vehicles such as off-highway vehicles, and the like, are normally provided with transmissions having a relatively great number of driving gear ratios in both the forward and reverse directions. Most of these transmissions have a power shift section and a range shift section, and require the use of two separate shift levers for operation of the transmission. This two shift lever arrangement is disadvantageous in that the operator of the vehicle must remember to return the power shift lever to the neutral position therefor before he moves the range shift lever.

The present invention contemplates a novel heavy duty transmission particularly designed and constructed for eliminating the need for two separate shift levers. The novel transmission has four forward speeds and two reverse speeds operable through a single shift lever. In addition, the novel device utilizes only three clutches for performing the entire transmission operation. The novel transmission comprises a plurality of gear members or gear shaft devices arranged concentrically around the drive shaft of the engine, or the like, with which the transmission is utilized. The gear shaft devices are also arranged concentrically around a common transfer gear shaft which in turn is in engagement with the output shaft. Thus, each gear shaft device is arranged for transmitting rotation from the drive shaft to the output shaft through the transfer gear. The overall arrangement of the gear shaft devices in relation to the transfer gear and input and output shafts permits a compact design for the transmission unit.

It is preferable to provide three of the gear shaft devices around the transfer shaft, with two of the gear shaft devices providing forward rotational movement for the output shaft and one of the gear members providing reverse rotation for the output shaft. Each of the gear shaft devices is arranged for providing two speeds of rotation for the output shaft, with the change in speed being provided by manipulation of a shift yoke member which is actuated by a shift lever. Each gear shaft device is provided with an individual clutch member and the gear devices are selectively engaged upon actuation of the respective clutch member. The clutches are actuated by fluid directed through a selector valve, and the selector valve is actuated by the shift lever which also operates the shift yoke member.

The shift pattern for the shift lever is preferably of the conventional H-type, and the operator of the vehicle, heavy duty unit, or the like, wherein the transmission is utilized, may select the desired speed and rotational direction for the output shaft by positioning the shift lever in the proper place in the H-pattern. On one side of the H-pattern the lever positions the yoke member in such a manner as to provide for one speed range for all gear shaft devices, and the other side of the H-pattern the lever positions the yoke member in such a manner for providing a second speed range for all of the gear shaft devices. The lever may be selectively positioned on each side of the H-pattern for actuation of the selector valve for engaging the desired gear shaft device with the transfer gear, thus permitting total operation of the transmission device through manipulation of a single shift lever.

It is an important object of this invention to provide a novel heavy duty transmission particularly designed and constructed for providing a plurality of forward and reverse drive directions for an output shaft through the manipulation of a single shift lever.

It is another object of this invention to provide a novel heavy duty transmission providing a plurality of forward and reverse drive directions for an output shaft in a manner requiring a minimum of clutch members.

Another object of this invention is to provide a novel heavy duty transmission of a compact overall configuration for facilitating installation of the transmission.

A further object of this invention is to provide a novel heavy duty transmission which is simple and efficient in operation and economical and durable in construction.

Other and further objects and advantageous features of the present invention will hereinafter more fully appear in connection with a detailed description of the drawings in which:

FIGURE 4 is a sectional elevational view schematically depicting a transmission gearing arrangement embodying the invention.

FIGURE 5 is a front elevational view schematically depicting the transmission gearing arrangement shown in FIGURE 4.

FIGURE 6 is a view showing the gear shift lever shifting pattern.

Figure 1:
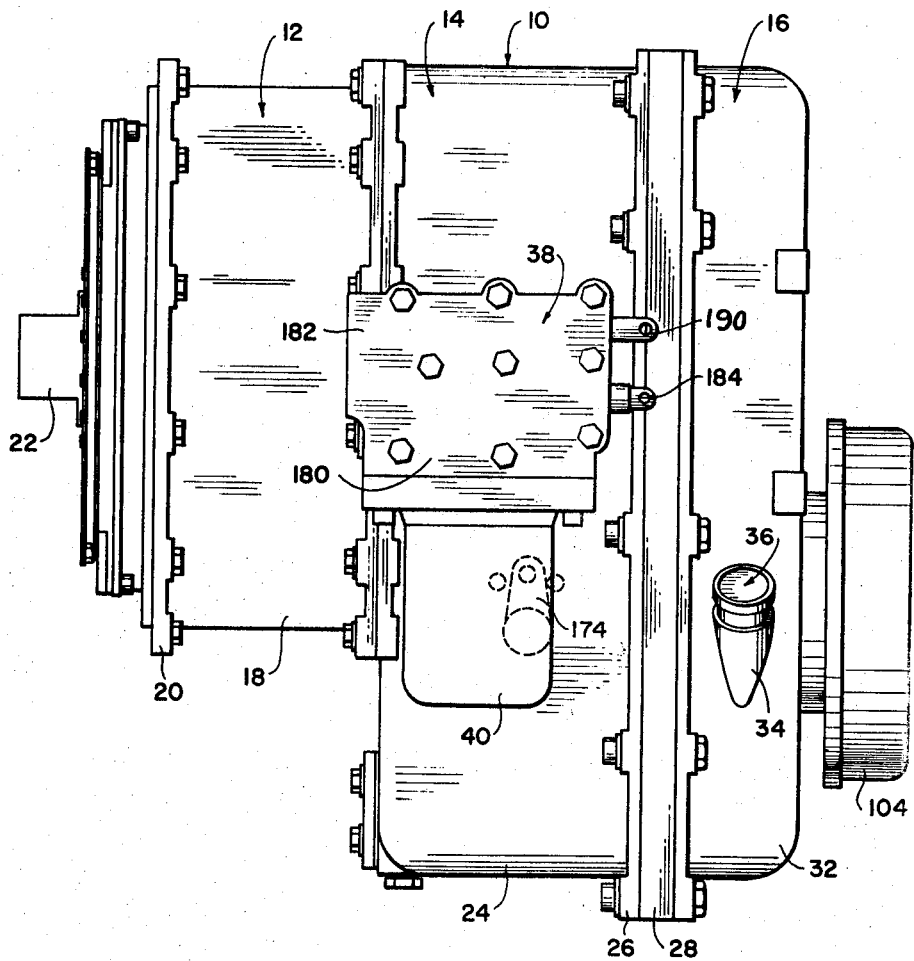
FIGURE 1 is a side elevational view of a transmission embodying the invention.

Referring to the drawings in detail, reference character 10 generally indicates a transmission comprising a torque converter section 12, a gear section 14, and a clutch section 16. The converter section 12 is disposed within or encased by a suitable outer housing 18 having a bolt flange 20 provided at one end thereof for facilitating securing or bolting of the housing 18 to the engine or power plant (not shown) with which the transmission 10 is to be utilized, as is well known. The housing 18 is secured around the drive shaft 22 of the engine for a purpose as will be hereinafter set forth.

The gear section 14 is also encased within a suitable outer housing 24 which is bolted or otherwise suitably secured to the opposite end of the converter housing 18 as is well known. The opposite end of the gear housing 24 may be provided with a suitable bolt flange 26 for receiving a partition member 28 thereagainst which provides a wall for one end of the gear section 14. Of course, the other end of the gear section 14 may be closed by the end 30 (FIGURE 3) of the housing 24.

The clutch section 16 is contained within or encased by a suitable outer housing or cover member 32 which is disposed against the plate or partition 28 and bolted to the housing 24 in any suitable or well known manner. It is preferable to provide a suitable filler port 34 in the clutch housing 32 for receiving the usual oil filter and check stick, generally indicated at 36.

A suitable selector valve generally indicated at 38 is secured to the housing 24 and is in communication with the interior thereof for a purpose and in a manner as will be hereinafter set forth. It is also preferable to provide a suitable oil filter unit 40 in association with the selector valve 38, and a suitable heat exchanger 42 may also be provided for the unit 10. It is to be noted, however, that the filter 40 and heat exchanger 42 may be remotely mounted with respect to the transmission 10, if desired. In addition, suitable pump mounting pads may be provided on the gear housing portion 32 as is well known in structures of this type.

Figure 3:
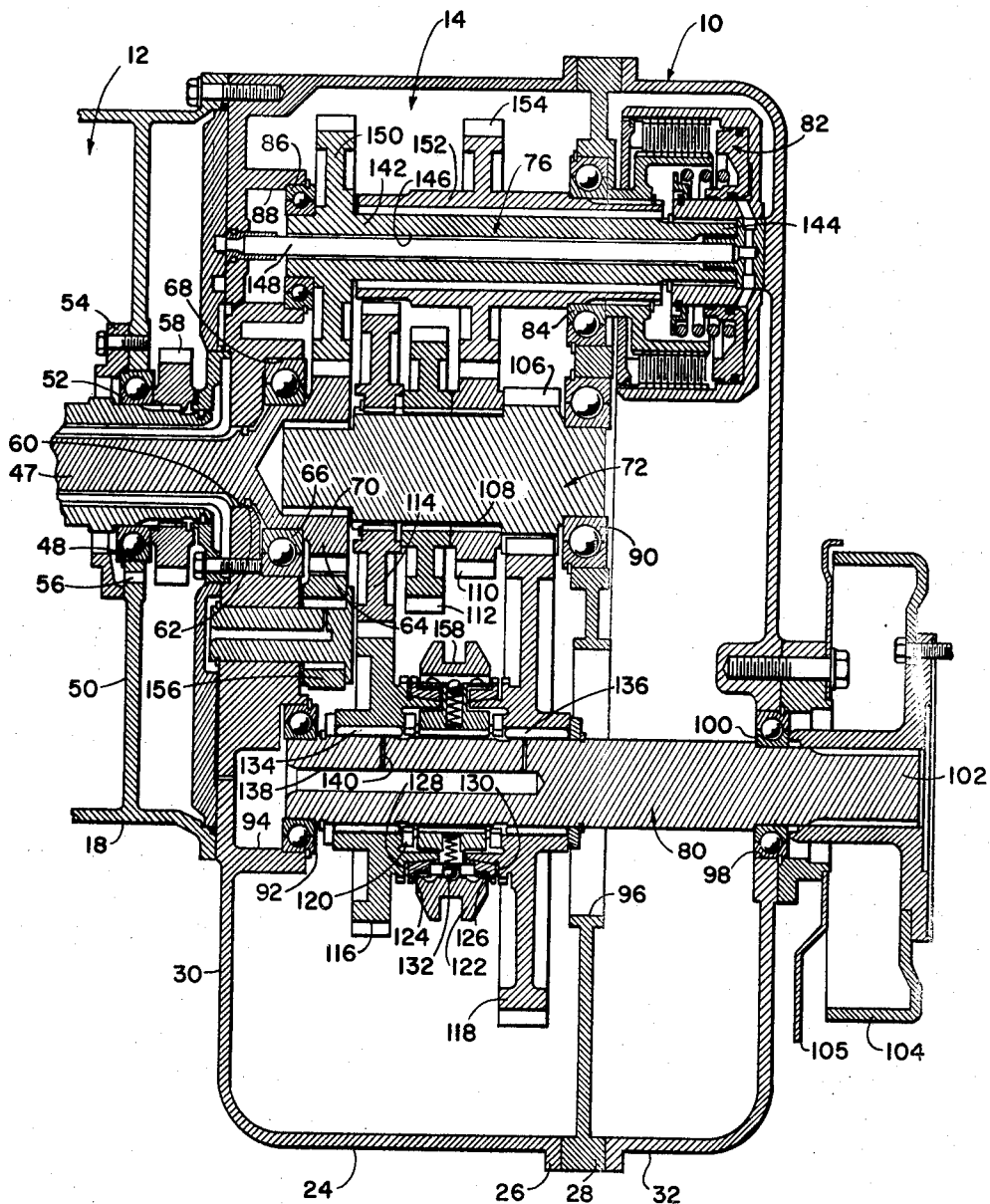
FIGURE 3 is a sectional view of a transmission embodying the invention.

Referring now to FIGURES 3, 4, and 5, the drive shaft of the engine or power plant (not shown) may extend directly into the drive connection with the transmission section 14. However, as depicted in FIGURES 3 and 4, the drive shaft of the engine is connected through the torque converter section 12 to an input shaft 47 which extends through an aperture 48 of a web or partition member 50 provided in the torque converter housing 18. The shaft 47 is preferably supported or journalled in the aperture 48 by a suitable bearing member 52. Of course, the bearing 52 may be retained in the aperture 48 by a retainer plate 54 which is bolted or otherwise secured to the web 50 as clearly shown in FIGURE 3. It is preferable to provide at least one port 56 in the web 50 to provide communication between the opposed sides of the web 50 for assuring an adequate distribution of lubricating fluid around the bearing 52 and shaft 47 as is well known. A gear 58 may be keyed or otherwise secured around the shaft 47 whereby rotation may be transmitted to the shaft 47 through the torque convertor section (the internal details of which are not shown) as is well known. The shaft 47 also extends through an aperture 60 in the wall 30 of the housing 24 and into the interior of the transmission section 14. A suitable sealing ring 62 is preferably interposed between the shaft 47 and aperture 60 for retaining the lubricating fluid within the transmission section 14 as is well known. Of course, the torque convertor section 12 may be eliminated when the engine drive shaft is connected directly to the transmission section 14.

The inner end of the shaft 47 is enlarged at 64 and is supported by or journalled in a suitable bearing 66 disposed in a recess 68 provided on the inner surface of the wall 30. A centrally disposed longitudinally extending bore 70 is provided in the enlarged portion 64 of the shaft 47 for receiving one end of a transfer gear shaft 72 therein. The enlarged portion 64 is provided with a suitable gear teeth extending around the outer periphery thereof whereby the enlarged portion 64 functions as a drive gear upon rotation of the input shaft 47 for a purpose and in a manner as will be hereinafter set forth in detail.

Referring now to FIGURE 5, the shaft 47 and transfer gear shaft 72 are preferably in axial alignment and a plurality of gear shaft members are radially disposed or concentrically arranged around the transfer gear 72 and input shaft 47. It is preferable to provide four gear shafts around the transfer gear shaft 72 with these four gear shafts being identified as follows: A first gear shaft 74 which in the present instance is considered the low gear shaft; a second gear shaft member 76 which in the present instance is considered to be the high gear shaft; a third gear shaft 78 which in the present instance is the reverse gear shaft; and a fourth gear shaft 80 which in the present instance is the output shaft. The axis of each of the gear shafts 74, 76, 78 and 80 are mutually parallel and parallel with the axis of the transfer gear shaft 72, and input shaft 47. The radial relationship between the transfer gear 72 and the gear shafts 74, 78 and 80 is clearly shown in FIGURE 5.

Each of the gear shafts 74, 76 and 80 are similarly geared to the driving gear 64 in a manner as will be hereinafter set forth, and the actuation of each gear shaft by the input shaft 47 is substantially identical. In addition, each of the gear shafts 74, 76 and 78 are operably geared to the transfer shaft 72 in a similar manner and function in a generally similar manner for transmitting rotation from the input shaft 47 to the transfer gear shaft 72. Accordingly, a detailed driving operation from the input shaft 47 to the output shaft 80 will be set forth in connection with the high gear 76 only, it being understood that the operation of the low gear 74 and reverse gear 78 is substantially identical thereto as will hereinafter be more fully set forth.

A suitable clutch member 82, is operably connected with each of the gear shafts 74, 76, and 78 in a manner as will be hereinafter set forth. Only one of the clutches 82 is shown in FIGURE 3, but it is understood that each gear shaft is provided with its own independent clutch 82. The clutches 82 are preferably of a hydraulic actuation multiple friction disc type which is well known, but is not limited thereto. Each gear shaft 74, 76, and 78 extends through the wall or partition 28 into the interior of the housing member 32 (only the gear shaft 76 being so depicted in FIGURE 3). The shafts 74, 76, and 78 are supported in the partition 28 by suitable bearing members 84 and the respective clutch member 82 is operably connected with the shaft portion disposed within the housing 32 whereby rotation may be selectively transmitted to the shafts 74, 76 and 78 upon actuation of the respective clutch 82. Of course, the opposite end of each of the gear shafts 74, 76, and 78 is supported in a suitable bearing member 86 disposed in a recess 88 provided on the inner surface of the wall 30. Thus, each of the shafts 74, 76, and 78 is journalled within the transmission section 14 for independent rotation therein. In addition, each clutch 82 is in operable communication with the selector valve 38 for actuation thereby, as will be hereinafter set forth.

The transfer gear shaft 72 is journalled within the transmission section 14 in any suitable manner and as shown in FIGURE 3, one end of the shaft 72 is supported by a suitable bearing member 90 secured in the partition 28 in any well known manner. The transfer gear shaft 72 is in driving connection with each of the gear shafts 74, 76, and 78, and is also geared to or in driving connection with the output shaft 80 as will be hereinafter set forth in detail. The output shaft 80 is journalled at one end by a bearing 92 disposed in a recess 94 provided in the wall 30, and extends through an aperture 96 in the partition 28 into and through the clutch section 10 and out through an aperture 98 provided in the housing member 32. The shaft 80 is supported in the aperture 98 by a suitable bearing 100, and it will be apparent that the output shaft 80 is thus rotatably mounted in the transmission 10. The outer end 102 of the output shaft 80 may be provided with a suitable braking device 104, if desired, as is well known.

The transfer gear shaft 72 is provided with an outwardly extending circumferential flange provided with gear teeth extending around the outer periphery thereof, thus forming a gear member 106 rotatable simultaneously with the shaft 72. Of course, the gear member 106 may be a separate member, or may be integral with the shaft 72 as shown in FIGURE 3. The outer periphery of the shaft 72 extending in a left hand direction from the gear 72 as viewed in FIGURE 3 is splined, or the like, as shown at 108 for receiving three gear members 110, 112, and 114 thereon. The gears 110, 112 and 114 are of different diametric sizes, with the gear 110 being of the smaller diameter and the gear 114 being of the largest diameter. In addition, it is preferable that the gear 106 be of a smaller diametric size than the gear 110. Of course, it will be apparent that any desired size ratio between the gears 106, 110, 112 and 114 may be provided. The gears 110, 112 and 114 are keyed or splined to the shaft 72 in any well known manner for rotation simultaneously therewith.

A pair of gear members 116 and 118 are provided on the output shaft 80 and are longitudinally spaced thereon. It is perferable that the gear 116 be of a smaller diametric size than the gear 118, and each gear 116 and 118 is independently rotatable with respect to the shaft 80 for a purpose as will be hereinafter set forth. The gear 116 is in meshing engagement with the gear 114 of the transfer gear shaft 72, and the gear 118 is in meshing engagement with the gear 106 of the transfer gear shaft 72. Of course, the gears 116 and 118 are retained against longitudinal movement on the shaft 80 in any suitable manner, such as by a plurality of spaced stop rings 120.

A shift yoke member 122 is slidably mounted on the outer periphery of the output shaft 80 and is interposed between the spaced gears 116 and 118. However, the yoke 122 is keyed or otherwise connected with the shaft 80 for simultaneous rotation therebetween. The gear 116 is provided with an annular friction face 124, or the like, extending in a direction toward the yoke 122. The gear 118 is provided with a similar friction face 126, or the like, extending in a direction toward the yoke 122. The members 124 and 126 may be of the type commonly known as synchronizer cones, or may be of the common clash type sliding collar shift, or the like. The yoke 122 is provided with oppositely disposed annular friction members 128 and 130 adapted for alternately engaging the faces 124 and 126, respectively, upon reciprocal sliding movement of the yoke member 122 along the shaft 80. The yoke 122 is preferably provided with three positive longitudinal positions on the shaft 80, namely a neutral position as shown in FIGURE 3, a left hand position as shown in FIGURE 3, and a right hand position as shown in FIGURE 3. The yoke 122 may be yieldably retained in the three positions in any well known manner, and as shown herein a spring urged ball and detent means, generally indicated at 132, is provided for locking the yoke in the said three positions.

The yoke 122 is shown in a neutral position in FIGURE 3 wherein there is no driving engagement between the yoke 120 and the gears 116 and 118. When the yoke 122 is moved in a left hand direction the face 128 will be moved into driving engagement with the face 124 and rotation will be transmitted from the gear 116 to the output shaft 80 through the yoke member 122. Similarly, when the yoke 122 is moved in a right hand direction the face 130 will be moved into driving engagement with the face 126 and rotation will be transmitted from the gear 118 to the output shaft 80 through the yoke member 122. The yoke 122 may be reciprocated along the shaft 80 in any suitable manner, and the means depicted herein for sliding of the yoke 122 will be hereinafter set forth.

Of course, suitable bearing members 134 and 136 may be interposed between the shaft 80 and the gear members 116 and 118, respectively, whereby the shaft 80 may rotate independently of the gear members 116 and 118, and conversely, the gear members 116 and 118 may rotate independently of the shaft 80. In addition, it is preferable to provide a central bore 138 extending longitudinally into the shaft 80 to provide communication between the left hand end of the shaft 80, as viewed in FIGURE 3, and a plurality of radial bores 140 which open in the vicinity of the gears 116 and 118. This permits adequate circulation of lubricating fluid to the gears and yoke 122 for assuring an efficient operation thereof.

As hereinbefore set forth, the gear shafts 74, 76, and 78 are generally similar in construction and operation, and the shaft 76 comprises a central shank member 142 having one end supported in the bearing 86 as hereinbefore set forth. The opposite end 144 is operably supported in the clutch 82 and a central bore 146 extends through the shank 142 for receiving a tube member 148 or the like thereof. The tube 148 extends beyond the shank 142 as clearly shown in FIGURE 3 and functions to direct fluid through the shank 142 and to the clutch 82 for actuation thereof as will be hereinafter set forth. The tube 148 is open to the selector valve 38 through ports (not shown) provided in the housing 24 for receiving fluid from the selector valve as will be hereinafter set forth. An outwardly extending circumferential flange 150 is provided in the proximity of the bearing member 86 and is provided with spaced gear teeth extending around the outer periphery thereof whereby the flange 150 becomes a gear and is in constant meshing engagement with the drive gear 64. Of course, the gear 150 may be integral with the shank 142 or may be separate therefrom with a keyed or splined connection therebetween, if desired. In any event the gear 150 and shank 142 rotate simultaneously during operation of the transmission 10.

An outer sleeve 152 is concentrically arranged around the shank 142 and is operably connected with the clutch 82 in any suitable manner whereby the sleeve 152 is rotated only when the clutch 82 connected therewith is engaged. Thus the sank 142 is freely rotatable independently from the sleeve 152. An outwardly extending radial flange 154 having suitable gear teeth extending around the outer periphery thereof is provided on the sleeve 152 to provide a gear for the sleeve 152. Of course, the gear 154 may be either integral with the sleeve 152 or may be an independent member connected with the sleeve 152 for simultaneous rotation therebetween. The gear 154 is spaced from the gear 150 in such a manner that the gear 154 is constantly in meshing engagement with the gear 110 of the transfer gear shaft 72.

The low gear shaft assembly 74 is of a substantially identical structure as the high gear shaft 76, the only exception being that the respective gear 154 (not shown) of the gear shaft 74 is spaced from the respective gear 150 (not shown) of the gear shaft 74 in such a manner as to be in constant meshing engagement with the gear 112 of the transfer gear shaft 72.

The reverse gear shaft assembly 78 is substantially identical with the low gear shaft 74, with the respective gear 154 (not shown) of the reverse gear shaft 78 being in constant meshing engagement with the gear 112. However, the respective gear 150 (not shown) of the reverse gear 78 is driven by an idler gear 156 (FIGURE 3) which is suitably journalled within the gear section 14 for constant meshing engagement with the drive gear 64. This results in a reverse direction of rotation for the reverse gear shaft 78 with respect to the gear shafts 74 and 76.

Referring particularly to FIGURE 4, a schematic view of the gear section 14 is depicted wherein the gear train operation of the invention may be readily followed. The input shaft 47 is rotated by the engine (not shown) as hereinbefore set forth for simultaneously rotating the drive gear 64. The rotation of the drive gear 64 is simultaneously transmitted to the respective shank member 142 of each gear shaft device 74, 76, and 78, whereby each shank 142 rotates continually during rotation of the input shaft 47. When it is desired to engage the high gear shaft assembly 76 to provide the drive power for the output shaft 80, the selector valve 38 is actuated in the normal manner for directing the operating or pressure fluid to the clutch 82 operably connected with the high gear shaft assembly 76. This engages the selected clutch 82 and transmits the rotation of the shank 142 to the sleeve 152 and gear 154 of the shaft assembly 76. The driving rotation of the gear 154 transmits rotation to the gear 110 and thus to the transfer gear shaft 72. The speed of rotation of the shaft 72 is determined by the size ratio between the mating gears 154 and 110.

The rotation of the shaft 72 causes the gear 106 to rotate simultaneously therewith, and rotation is transmitted simultaneously from the gear 106 to the gear 118, and from the gear 114 to the gear 116. The gears 114 rotate freely or independently with respect to the output shaft 80 as long as the yoke member 122 is in the centered or neutral position. Of course, the speed of rotation of the transfer gear shaft 72 is determined by the gear ratio between the gears 154 and 110. Similarly, the speed or rotation of the gear 118 is determined by the ratio thereof with the gear 106, and the speed of rotation of the gear 116 is determined by the ratio thereof with the gear 114. If the rotating speed of the gear 116 is desired for the rotation of the output shaft 80, the yoke member 122 is moved in a left hand direction along the shaft 80, as viewed in FIGURE 4, for engaging the gear 116, thus connecting the gear 116 with the shaft 80. If the rotating speed of the gear 118 is desired for rotation of the output shaft 80, the yoke member 122 is moved in a right hand direction along the shaft 80 for engaging the gear 118, thus connecting the gear 118 with the shaft 80. Thus, two driving speeds or rotating speeds for the output shaft 80 are provided from the single gear shaft assembly 76.

As hereinbefore set forth, the operation of the gear shaft assembly 74 is substantially identical with that of the shaft assembly 76, with the only difference being that the speed of rotation of the transfer shaft 72 will be different as established by the gear ratio between the gear 112 and the respective gear 154 of the gear assembly 74, thus providing two different speeds for the output shaft 80.

The operation of the reverse gear shaft assembly 78 is substantially identical with the operation of he gear shaft assembly 74, providing the same rotational speed selections for the output shaft 80. However, the rotation of the output shaft 80 will be in a reverse direction with respect to the direction of rotation thereof when driven by the assemblies 74 and 76.

Referring now to FIGURES 7 through 10, whereas the yoke 122 may be actuated in any suitable manner, it is preferable to provide a fork member 156 engageable with an annular groove or recess 158 (FIGURE 3) provided around the outer periphery of the yoke member 122. A shank member 160 extends outwardly from the fork member 156 in a direction away from the yoke 122 and is journalled in a bore 162 in a collar member 164. The collar member 164 is provided with a second bore 166 having a rod member 168 rigidly secured therein by means of a set screw 170, or the like, whereby the collar 164 may be rotated upon rotation of the rod 168. The rod 168 extends outwardly through an apertured boss member 172 provided on the outer periphery of the housing 24 and is provided with a handle or lever member 174 rigidly secured to the outer end thereof. The lever 174 is preferably provided with an aperture 176 for facilitating securing of the lever 174 with the actuating mechanism therefor as will be hereinafter set forth. Of course, a suitable seal member 178 may be provided around the rod 168 for precluding leakage of fluid therearound and for facilitating rotation of the rod during operation thereof.

Figure 7:
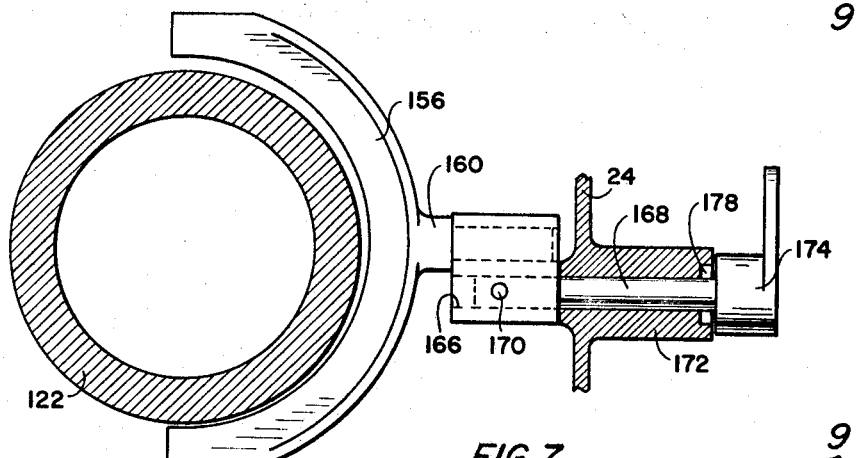
FIGURE 7 is an enlarged side elevational view of the range shift yoke member depicting one position thereof.
Figure 8:
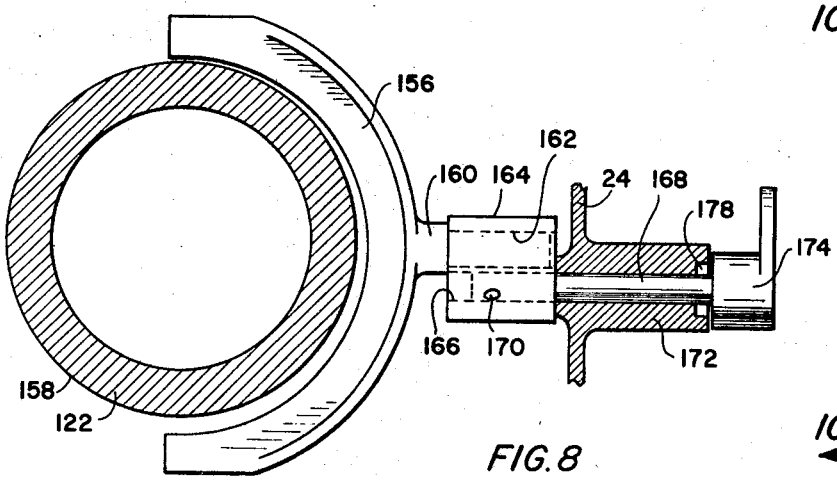
FIGURE 8 is a view similar to FIGURE 7 depicting another position of the shift yoke member.
Figure 9:
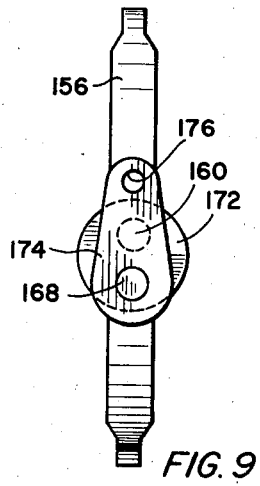
FIGURE 9 is a view taken on line 9—9 of FIGURE 7.
Figure 10:
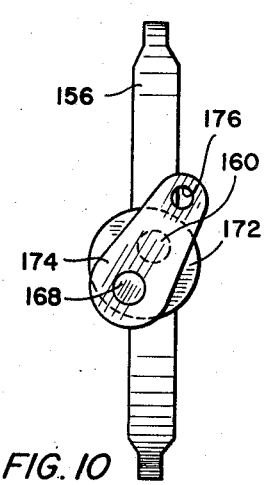
FIGURE 10 is a view taken on line 10—10 of FIGURE 8.

When the yoke member 122 is disposed in the neutral position shown in FIGURE 3, the lever member 174 is in a substantially vertical position, as shown in FIGURES 7 and 9. In addition, the fork member 156 is substantially centrally disposed with respect to the collar 164 and boss 172 as particularly shown in FIGURE 9. When it is desired to move the yoke 122 in a right hand direction as viewed in FIGURES 3 and 9 the lever 174 is rotated in a clockwise direction to the position shown in FIGURE 10. The rotation of the lever 174 transmits rotation to the rod 168 and the collar 164 rotates about the offset axis of the rod 168. This causes the shank 160 to move in a clockwise direction about the axis of the rod 168, moving the fork 156 therewith. Of course, the fork 156 is held against an angular movement with respect to the plane of the groove 158 and remains in a substantially perpendicular or vertical position, but moves in a sideways direction to the position shown in FIGURE 10. Of course, this movement of the fork 156 slides the yoke 122 in a right hand direction along the shaft 80 whereby the yoke is engaged with the gear 118.

The ball and detent means 124 retains the yoke 122 in the right hand position until such time as it is desired to release the engagement between the yoke 122 and the gear 118. The yoke 122 may be returned to the neutral position by rotating the lever 174 in a counterclockwise direction from the position shown in FIGURE 10 until the lever 174 is in the vertical position therefor. Of course, in order to move the yoke 122 in a left hand direction as viewed in FIGURES 3 and 9, the lever 174 is rotated in a counterclockwise direction from the neutral position whereby the yoke 122 is moved along the shaft 80 into engagement with the gear 116. The yoke 122 is maintained in engagement with the gear 116 by the ball and detent means until it is desired to release the engagement therebetween, whereupon the lever may be moved back to the vertical or neutral position therefor shown in FIGURE 9.

Figure 12:
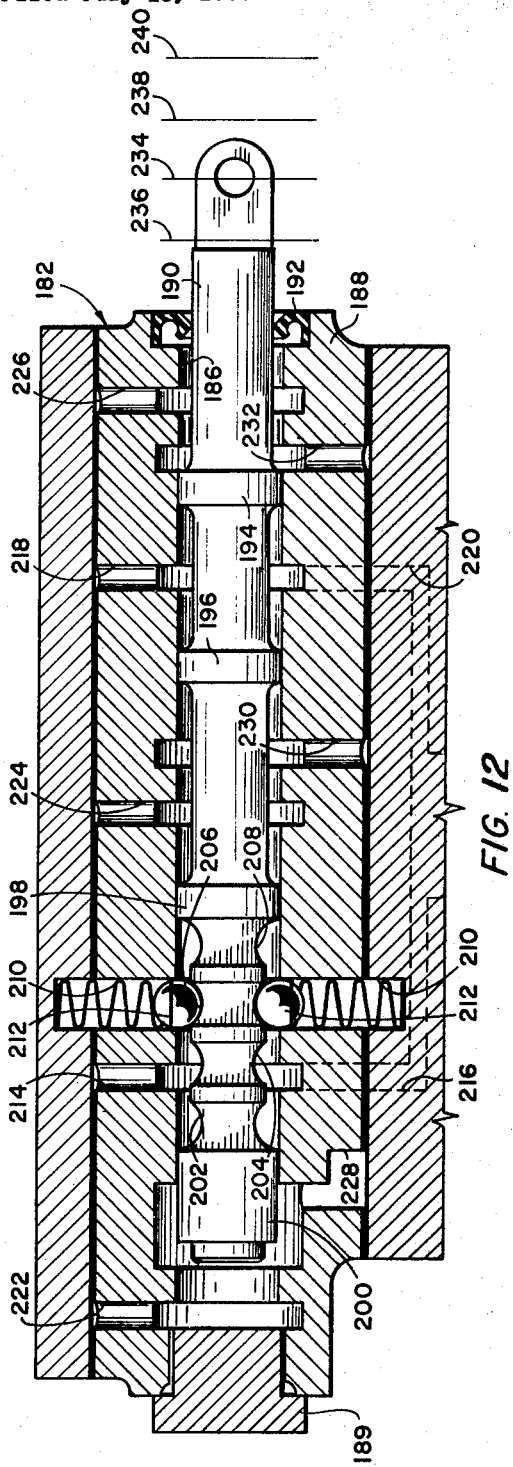
FIGURE 12 is a sectional elevational view of a selector as may be utilized in connection with the invention.

The selector valve 38 may be of any suitable type whereby hydraulic fluid or other pressure medium may be selectively directed to the clutches 82 for independent actuation thereof. The selector valve as shown herein preferably comprises a pair of coacting valve devices wherein one of the valve devices is a cut-off of valve 180 in operable communication with a selector valve device 182. The cut-off valve section 180 is preferably of the slide valve type operable by a reciprocal spool member indicated at 184 for facilitating the flow of the pressure fluid to and from the selector valve section 182, as is well known. The internal details of the cut-off valve section 180 are not shown herein since the cut-off valve may be of any suitable type. The preferred structure for the selector valve section 182, however, is depicted in FIGURE 12.

The selector valve section 182 comprises a bore 186 extending through the body portion 188 of the valve 38 and having one end closed by a suitable plug member 189 and the opposite end thereof open for receiving a valve stem or spool member 190 therein. The plug member 189 limits the reciprocal movement of the stem 190 in one direction and a suitable annular member 192 disposed in the open end of the bore 186 limits the movement of the stem 190 in the opposite direction, as well as providing a seal around the stem 190. A plurality of spaced lands, preferably four as shown at 194, 196, 198, and 200, are provided on the outer periphery of the spool member 190 for closely engaging the inner periphery of the bore 186 whereby flow of fluid between the lands and bore will be substantially precluded, as is well known. In addition, a plurality of arcuate detents, preferably four as shown at 202, 204, 206 and 208, are provided on the outer periphery of the stem 190 and are preferably interposed between the lands 198 and 200. A plurality of spaced bores 210 are provided in the body 188 and extend radially outward from the bore 186 in the proximity of the detents 202, 204, 206 and 208. A spring urged ball 212 is disposed in each bore 210 and each ball 212 is maintained in the particular detent disposed in alignment with the bores 210 for yieldably retaining the stem 190 in a preselected position within the bore 186 for a purpose and as will be hereinafter set forth.

A first inlet part 214 is provided in the body 38 extending into the bore 186 in the proximity of the detents. The port 214 is in communication with the cut-off valve 180 through a suitable passageway 216 for directing a supply of pressure fluid into the bore 186. A second inlet port 218 is provided in the body 188 extending into the bore 186 and spaced from the bore 214 as shown in FIGURE 12. The bore 218 is in communication with the cut-off valve 180 through a suitable passageway 220 for direction of a supply of pressure fluid into the bore 186. A first fluid return port 222 is provided in the body 188 in the proximity of the left hand end thereof as viewed in FIGURE 12 and is in communication with the cut-off valve 180 through a passageway (not shown) whereby pressure fluid may be returned through the selector valve 182 to the cut-off valve 180. A second fluid return port 224 is provided in the body 188 and substantially disposed between the outer ends of the bore 186. The port 224 is also in communication with the cut-off valve 180 through a suitable passageway (not shown) for returning the pressure fluid to the cut-off valve. A third fluid return port 226 is provided in the body 188 in the proximity of the right hand end thereof as viewed in FIGURE 12 and is also in communication with the cut-off valve 180 through a suitable passageway (not shown) for returning fluid through the selector valve 182 ot the cut-off valve 180.

A first outlet port 228 is provided in the body 188 to provide communication from the bore 186 to the tube 146 of the reverse gear shaft assembly 78. The outlet port 228 is interposed between the inlet port 214 and fluid return port 222 for a purpose as will be hereinafter set forth. A second outlet port 230 is provided in the body 188 to provide communication from the bore 186 to the tube 146 of the high gear shaft assembly 76 and is interposed between the inlet port 218 and fluid return port 224 for a purpose as will be hereinafter set forth. A third outlet port 232 is provided in the body 188 to provide communication from the bore 186 to the tube 146 of the low gear shaft assembly 74 and is interposed between the inlet port 218 and fluid return port 226 for a purpose as will be hereinafter set forth.

The selector valve section 182 is operable by the reciprocal movement of the spool or valve stem member 190 as is well known in this type of valve. In the position shown in FIGURE 12, the valve 182 is in a neutral position, as indicated by the line 234. In this neutral position, any pressure fluid being delivered to the bore 186 through the inlet ports 214 and 218 is trapped within the bore 186 and cannot flow through the selector valve 182. The fluid entering the bore 186 through the port 214 is blocked by the lands 198 and 200 and the fluid entering the bore 186 through the port 218 is blocked by the lands 194 and 196. If it is desired to engage the clutch 82 of the reverse gear assembly 78, the stem 190 is moved in a left hand direction as viewed in FIGURE 12 to the position indicated by the line 236. In this position, the detent 208 will be moved into substantial alignment with the bores 210 and the balls 212 will engage the detent 208 for yieldably retaining the stem 190 in this position. The land 200 will be moved in a left hand direction and thus communication will be established between the inlet port 214 and the reverse outlet port 228. The pressure fluid will then be directed to the clutch 82 of the reverse gear shaft assembly 78 for actuation thereof as hereinbefore set forth. When the stem 190 is returned to the neutral position the pressure fluid will bleed from the reverse gear shaft assembly 78 through the port 228 and to the fluid return port 222 for delivery to the cut-off valve 180.

When it is desired to engage the clutch 82 of the low gear shaft assembly 74, the spool or stem 190 is moved in a right direction to the position indicated by the line 238. This moves the land 194 to the right of the outlet port 232 and establishes communication between the inlet port 218 and the port 232 whereby the pressure fluid will be delivered to the tube 146 of the low gear assembly 74 and to the clutch 82 thereof for engaging the low gear assembly. In this position of the stem 190, the detent 204 will be in substantial alignment with the bores 210 and the balls 212 will engage the detent 204 for yieldably retaining the stem 190 in the low gear position. When the stem 190 is returned to the neutral position the pressure fluid will bleed from the low gear assembly 74 through the port 226 to the cut-off valve 180.

When it is desired to engage the clutch 82 of the high gear shaft assembly 76, the stem 190 is moved further to the right and to the position indicated by the line 240. This moves the land 196 to the right of the port 218 and establishes communication between the port 218 and high gear port 230 whereby fluid will be delivered to the tube 146 of the high gear assembly 76 thus engaging the clutch 82 thereof. At the same time, the detent 202 will be moved into substantial alignment with the bores 210 and the balls 212 will engage the detent 202 for yieldably retaining the stem 190 in the high gear position. When the stem 190 is returned to the neutral position, the fluid will bleed from the high gear assembly 76 through the fluid return port 224 to the cut-off valve 180.

The ball and detent means provides a "feel" for the operation of the selector valve 182 for facilitating manual operation of the transmission 10. In addition, the plug member 189 limits the left hand movement of the stem 190 and the engagement of the ring 192 with the land 194 will limit the right hand movement of the stem, thus substantially eliminating any accidental removal of the stem 190 from the bore 186.

Figure 11:
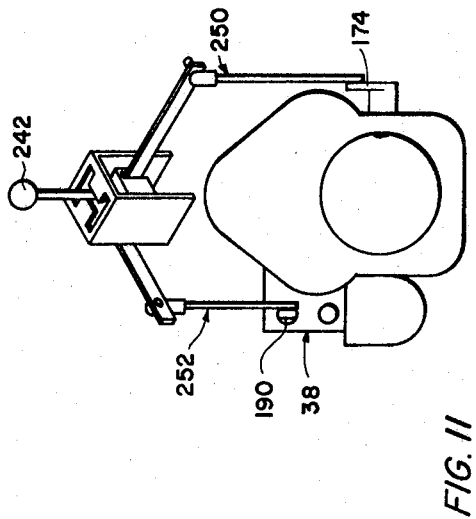
FIGURE 11 is a schematic view depicting the shift lever for actuation of the transmission embodying the invention.

Referring now to FIGURES 6 and 11, the yoke member 122 and selector valve 182 are both actuated by a single or common shift lever 242. The gear shift lever 242 is mounted in the cab of the vehicle (not shown) or above the transmission 10, or in any location therefor as is well known and in wide spread use. The shift pattern for the lever 242 is a substantially H-shaped pattern as shown in FIGURE 6. One side 244 of the H-pattern is the slow speed side, and the other side 246 of the H-pattern is the fast speed side. The crossbar 248 of the H-pattern is the neutral position. The movement of the lever 242 in the cross bar 248 shifts the yoke 122, and the movement of the lever in the sides 244 and 246 shifts the stem 190 of the selector valve. The lever 242 may be mechanically, hydraulically, pneumatically, or otherwise connected with the lever 174 of the fork 156 as schematically indicated at 250 in FIGURE 11 whereby the movement of the lever 242 in the cross bar 248 pivots the lever 174 as hereinbefore set forth. Similarly, the lever 242 may be mechanically, hydraulically, pneumatically, or otherwise connected with the stem 190 of the selector valve as indicated schematically at 252 in FIGURE 11 whereby the movement of the lever 242 in the sides 244 and 246 of the H-pattern reciprocates the stem 190 in the bore 186. This type of connection is well known, and many different methods of connecting the shift lever 242 with the lever 174 and stem 190 may be utilized.

Referring particularly to FIGURE 6, the H-pattern for the movement of the shift lever 242 facilitates positioning of the lever 242 in the plurality of positions for providing the desired output action for the output shaft 80. As hereinbefore set forth, when the lever 242 is disposed in the left hand side 244 of the shifting pattern, as viewed in FIGURE 6, the yoke member 122 is positioned in engagement with the gear 118, thus providing the slow range output speed for the shaft 80. When the lever 242 is disposed in the right hand side 246 of the shifting pattern, the yoke member 122 is positioned in engagement with the gear 116, thus providing the fast range output speed for the shaft 80. When the lever 244 is disposed in the neutral position in the cross bar 248 of the H-pattern, as clearly indicated in FIGURE 6, the yoke member 122 is disposed in the neutral position shown in FIGURE 3 and the stem 190 will also be disposed in the neutral position shown in FIGURE 12. Thus, none of the clutch members 82 will be engaged, and the output shaft 80 will not be rotated.

When the lever 242 is moved to the neutral position of the side 244, the yoke 122 will be moved into engagement with the gear 118. However, the stem 190 will remain in the neutral position thereof and none of the clutches 82 will be engaged. Thus, no rotation will be transmitted to the shaft 80. When the lever 242 is moved to the upper position in the side 244 of the H-pattern, which is indicated as reverse in FIGURE 6, the yoke 122 will remain in engagement with the gear 118, and the stem 190 will be moved to the reverse position therefor as indicated in FIGURE 12. With the stem 190 in the reverse position, the clutch 82 of the reverse clutch assembly 78 will be engaged and the output shaft 80 will be rotated in the reverse direction and at the lower speed range of the reverse gear drive.

When the lever 242 is moved to the low gear position of the pattern side 244, as indicated in FIGURE 6, the yoke member 122 will remain in engagement with the gear 118, but the stem 190 will be moved to the low position therefor as indicated in FIGURE 12 whereby the clutch 82 of the low gear shaft assembly 74 will be engaged. The output shaft 80 will then be connected with the low gear shaft assembly for rotation 74 in the slower speed range thereof.

When the lever 242 is disposed in the lowermost or position indicated second on the pattern side 244, as shown in FIGURE 6, the yoke 122 will remain in engagement with the gear 118, but the stem 190 will be moved to the high position therefor, as indicated in FIGURE 12, and the clutch 82 of the high gear shaft assembly 76 will be engaged. Thus, the output shaft 80 will be connected with the high gear shaft assembly 76 for rotation in the slower speed range thereof.

As the lever 242 moves through the cross bar 248 of the H-pattern the yoke 122 is shifted from the engagement with the gear 118 and into engagement with the gear 116. When the lever 242 is in the neutral position of the right hand side 246 of the H-pattern, as indicated in FIGURE 6, the yoke 122 will be engaged with the gear 116, but the stem 190 will be in the neutral position and none of the clutches 82 will be engaged. Thus, the output shaft 80 will not be rotated. When the lever 242 is moved to the uppermost or reverse position of the side 246, the yoke 122 will remain in engagement with the gear 116, and the stem 190 will be moved to the reverse position therefor. Thus, the clutch member 82 of the reverse gear shaft assembly 78 will be engaged and the output shaft 80 will be connected with the reverse gear shaft assembly for rotation thereby in the fast speed range thereof.

When the lever 242 is moved to the position indicated as third on the side 246 of the H-pattern, the yoke 122 will remain in engagement with the gear 116, and the stem 190 will be moved to the low position therefor. Thus, the clutch 82 of the low gear shaft assembly 74 will be engaged and the shatf 80 will be connected with the low gear shaft assembly for rotation in the fast speed range thereof.

When the lever 242 is moved to the lowermost of high position on the side 246 of the H-pattern, the yoke 122 will remain in engagement with the gear 116, and the stem 190 will be moved to the high position therefor. The clutch 82 of the high gear shaft assembly 76 will then be engaged and the output shaft 80 will be connected with the high gear shaft assemby for rotation in the fast speed range thereof.

Of course, a suitable supply of lubricating fluid (not shown) is provided in the gear section 14, as is well known, whereby all the gear and bearing members and other moving elements are properly lubricated during operation of the transmission 10. It is preferable that the friction engaging members of the clutches 82 be sealed from the lubricating fluid and pressure fluid, as is well known, to assure an efficient operation of the clutches.

Figure 2:
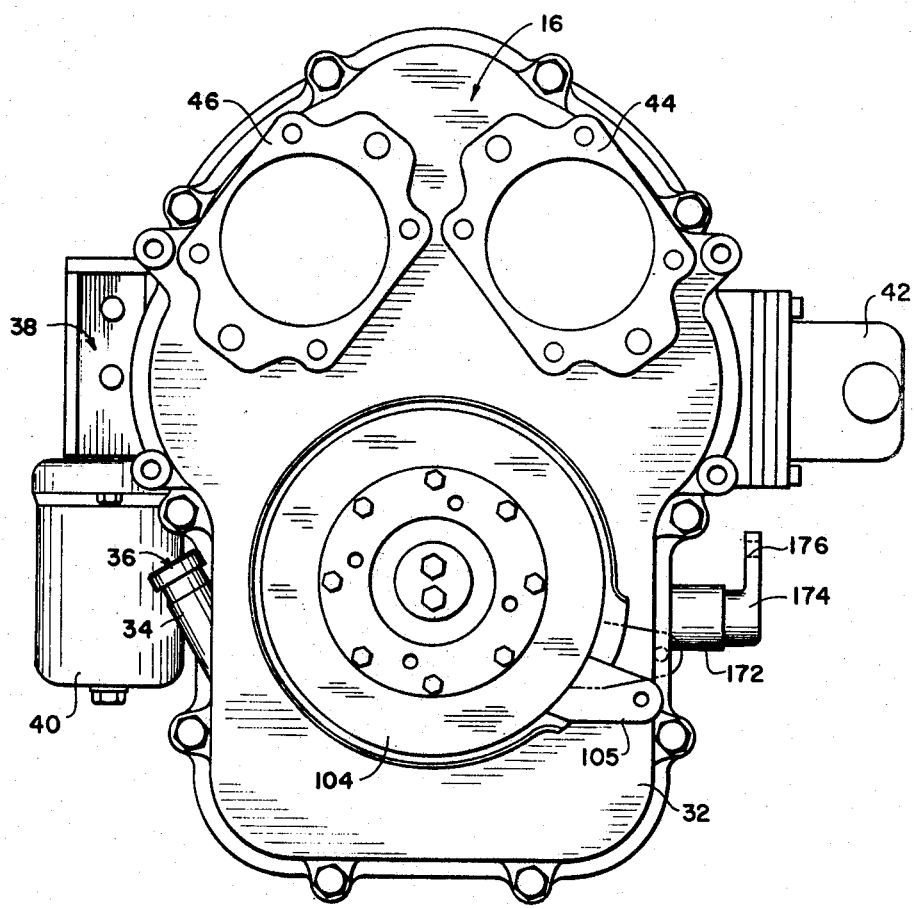
FIGURE 2 is a front elevational view of a transmission embodying the invention.

In addition, the rotation of the output shaft 80 may be controlled or braked in any suitable manner. The brake device 104 shown herein is disposed around the shaft 80 and may be provided with an actuating lever 105 which may be manually or otherwise moved from the position shown in solid lines in FIGURE 2 toward the position shown in broken lines therein whereby the usual brake bands, or the like (not shown), may be moved into braking engagement with the shaft 80 for stopping the rotation thereof, as is well known. The braking action may be released by returning the lever 105 to the position shown in solid lines. The actuating lever 105 may be suitably linked or connected with the usual hand brake lever (not shown), as desired, for facilitating application of the brake 104. It will be readily apparent that it is preferable to provide a slip-type arrangement (not shown) for the clutches 82 in order to preclude breakage of any gear teeth, or the like, when the brake 104 is applied, as is well known.

It will be readily apparent that one or more idler gear shaft assemblies (not shown) may be interposed between the transfer gear assembly 72 and the output shaft 80, if desired, wherein space requirements are such that the linear distance between the axis of the input shaft 47 and the axis of the output shaft 80 is greater than that which can be easily spanned by the particular arrangement depicted herein. In addition, any number of the clutch assemblies may be arranged around the input shaft and transfer gear and there is no intention of limiting the invention to the two forward clutch assemblies and one reverse clutch assembly as shown herein. It may be desirable to include only one forward clutch assembly and one reverse assembly to provide two forward speeds and two reverse speeds, or it may be desirable to arrange two forward clutch assemblies and two reverse assemblies to provide four forward speeds and four reverse speeds. However, the overall operation and result obtained is essentially identical with that disclosed herein.

From the foregoing it will be apparent that the present invention provides a novel heavy duty transmission having four forward speeds and two reverse speeds, all being operable by manipulation of a single shift lever. The novel transmission comprises a plurality of gear shaft assemblies radially or concentrically arranged around the input shaft and the transfer gear whereby the output shaft may be selectively connected with the gear shaft assembly. Each gear shaft assembly is provided with an independent clutch member for independent actuation thereof, and each gear shaft assembly drives the output shaft through a common two speed range yoke shifting device. The shift lever is actuated through a well known H-pattern thereby providing a simplicity of operation of the device. The novel transmission device is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A heavy duty transmission comprising input means, output means, a plurality of drive gear means operably connected with the input means for actuation thereby, common transfer gear means operably connected between each of said drive gear means and said output means for transmitting rotation to the output means, selective speed means interposed between the output means and transfer gear means, shift means carried by the output means and selectively engageable with the selective speed means for varying the speed of rotation of the output means, independent clutch means operably connected with each of said drive gear means, selector valve means in independent communication with each of said clutch means for individual operation thereof, and common shift lever means operably connected with the shift means and selector valve means for actuation thereof.

2. A heavy duty transmission as set forth in claim 1 wherein said drive gear means are radially spaced around the input means for simultaneous actuation thereby, and including idler gear means interposed between the input means and one of said drive gear means whereby said one drive gear is rotated in a reverse direction from the other of said drive gear means to provide a reverse rotational direction for the output means upon actuation of the said one drive gear means.

3. A heavy duty transmission as set forth in claim 1 wherein the transfer gear means is disposed in substantially axial alignment with the input means, said plurality of drive gear means being radially spaced around the input means and transfer gear means, each of said drive gear means being in constant operable engagement between the input means and transfer gear means, and each of said drive gear means is independently operable upon actuation of the respective clutch means for selective transmission of rotation from the input means to the transfer gear means.

4. A heavy duty transmission as set forth in claim 1 wherein each drive gear means comprises a central rotatable shaft operably connected with the respective clutch, gear means rigidly secured to the shaft and in constant operate engagement with the input means for transmitting rotation to the shaft, outer sleeve means concentrically disposed around the shaft and operably connected with the respective clutch for rotation only when the said clutch is actuated, gear means rigidly secured to the sleeve for rotation simultaneously therewith and being in constant operable engagement with the transfer gear means for actuation thereof upon rotation of the sleeve.

5. A heavy duty transmission as set forth in claim 1 wherein the transfer gear means comprises a central rotatable shaft, a plurality of variable sized gear members rigidly secured to the shaft for simultaneous rotation therebetween, at least two of said gear members being in constant engagement with the selective means for rotation thereof during rotation of the shaft, each of the remaining gear members being in independent engagement with one of the drive gear means for rotation thereby, whereby rotation is transmitted from the input means through one drive gear means to the transfer gear means.

6. A heavy duty transmission as set forth in claim 5 wherein the transfer gear shaft is disposed in substantial axial alignment with the input means, and the plurality of drive gear means is radially spaced around the transfer gear shaft.

7. A heavy duty transmission as set forth in claim 1 wherein the selective speed means comprises a first gear member journalled on the output means and independently rotatable with respect thereto, a second gear member journalled on the output means for independent rotation with respect thereto, said second gear member being of a different diametric size than the first gear member, and said second gear member being spaced from the first gear member whereby the shift means may alternately engage the first and second gear member for alternately connecting the gear members with the output means for a driving connection therebetween to provide a two speed output for each of said plurality of drive gear means.

8. A heavy duty transmission as set forth in claim 1 wherein the shift means comprises a yoke member secured to the output means for rotation simultaneously therewith and slidable thereon, said yoke member disposed in association with said selective speed means whereby slidable movement of the yoke member in one direction to a first position connects one portion of said selective speed means with the output means for rotation thereof at one speed, movement of the yoke member in an opposite direction to a second connects a second portion of said selective speed means with the output means to provide rotation thereof at a secnd speed, and movement of the yoke member to a third position precludes engagement of the selective speed means with the output means for precluding rotation thereof.

9. A heavy duty transmission comprising input means, output means, a plurality of drive gear means radially spaced around the input means and in constant driving engagement therewith for rotation thereby, transfer gear means in operable driving engagement with each of said drive gear means for selective rotation thereby, said transfer gear means being disposed in a substantial axial alignment with said input means and concentrically disposed with respect to the longitudinal axes of the drive gear means, independent clutch means operably connected with each of said drive gear means, selector valve means operably connected with each clutch means for independent engagement thereof, selective speed driving means interposed between the transfer gear means and output means for transmitting variable speed rotation from the transfer gear means to the output means, shift means carried by the output means for selective engagement of the selective speed driving means to provide said variable speed rotation for said output means, and a common shift lever connected with the selector valve means and the shift means for actuation thereof.

10. A heavy duty transmission as set forth in claim 9 wherein idler gear means isinterposed between the input means and at least one of the drive gear means to provide a reverse drive for the output means.

11. A heavy duty transmission as set forth in claim 9 wherein the plurality of drive gear means comprises a high drive gear assembly operably connected with the input means for rotation thereby, a low gear drive gear assembly operably connected with the input means for rotation thereby, a reverse gear drive assembly operably connected with the input means for rotation thereby, idler gear means interposed between the input means and the reverse drive gear assembly to provide a reverse rotational direction therefor with respect to the high and low drive gear assemblies, each of said drive gear assemblies being independently operable for transmission of rotation to the transfer gear means upon engagement of the respective clutch means.

12. A heavy duty transmission as set forth in claim 11 wherein each drive gear means comprises a central rotatable shaft operable connected with the respective clutch means, a gear member rigidly secured to the shaft and in operable engagement with the input means for rotation thereby, an outer sleeve member concentrically disposed around the shaft for rotation independently with respect thereto, said sleeve being operably connected with said respective clutch means for rotation only upon engagement of said clutch means, a gear member rigidly secured to the sleeve for rotation simultaneously therewith, said sleeve gear being operably connected with the transfer gear means for transmitting rotation thereto upon engagement of said clutch means.

13. A heavy duty transmission as set forth in claim 9 wherein said input means includes an input shaft journalled for rotation by a prime mover, a gear member rigidly secured to the input shaft for rotation simultaneously therewith, and wherein each of said radially spaced drive gear means is provided with a gear member operably engaged by said input shaft gear member for rotation simultaneously therewith, and each of said radially spaced drive gear means is provided with a second gear member in operable engagement with the transfer gear, said second gear members being rotatable only upon engagement of the respective clutch means whereby rotation may be selectively transmitted to the transfer gear.

14. A heavy duty transmission as set forth in claim 9 wherein the selector valve means comprises a housing having inlet ports for receiving pressure fluid therein and outlet ports in independent communication with each of the clutch means and recirculation ports for return flow of the pressure fluid, an internal bore in communication with each of the ports, a valve stem slidably disposed within the bore and movable to selected positions therein for directing the pressure fluid independently to each of the said clutch means for selective engagement thereof, and said valve stem being operably connected with said shift lever for actuation thereby.

References Cited

UNITED STATES PATENTS

| | | | |
|---|---|---|---|
| 1,827,582 | 10/1931 | Jacobs | 74—359 |
| 2,825,232 | 3/1958 | Sieving et al. | 74—331 |
| 3,318,167 | 5/1967 | Frost | 74—331 |

ARTHUR T. McKEON, Primary Examiner

U.S. Cl. X.R.

74—333, 359